US006032056A

United States Patent [19]
Reudink

[11] Patent Number: 6,032,056
[45] Date of Patent: Feb. 29, 2000

[54] CELLULAR SYSTEM SIGNAL CONDITIONER

[75] Inventor: Douglas O. Reudink, Bellevue, Wash.

[73] Assignee: Metawave Communications Corporation, Redmond, Wash.

[21] Appl. No.: 09/094,119

[22] Filed: Jun. 9, 1998

Related U.S. Application Data

[63] Continuation of application No. 08/651,980, May 20, 1996, Pat. No. 5,781,864.

[51] Int. Cl.[7] .............................. H04B 1/00; H04B 7/00; H04B 7/185; H04B 7/19
[52] U.S. Cl. .......................................... 455/560; 455/562
[58] Field of Search ..................................... 455/560, 561, 455/562, 421, 9, 67.1, 67.3, 517, 150.1, 412, 59, 62, 567, 506, 520, 101, 12.1, 13.1, 13.3, 13.4, 25; 375/347, 211, 349, 267; 370/315–18, 340, 342

[56] References Cited

U.S. PATENT DOCUMENTS

| | | | |
|---|---|---|---|
| 4,121,158 | 10/1978 | Hanni | 325/55 |
| 4,694,484 | 9/1987 | Atkinson et al. | 379/59 |
| 5,067,147 | 11/1991 | Lee | 379/60 |
| 5,193,109 | 3/1993 | Chien-Yeh Lee | 379/60 |
| 5,239,571 | 8/1993 | Takahashi | 379/58 |
| 5,426,690 | 6/1995 | Hikuma et al. | 379/62 |
| 5,504,936 | 4/1996 | Lee | 455/33 |
| 5,563,610 | 10/1996 | Reudink | 342/375 |
| 5,566,236 | 10/1996 | MeLampy et al. | 379/201 |
| 5,617,468 | 4/1997 | Nojima et al. | 379/58 |
| 5,648,968 | 7/1997 | Reudink | 370/335 |
| 5,722,068 | 2/1998 | Bartle et al. | 455/421 |
| 5,781,864 | 7/1998 | Reudink | 455/560 |

FOREIGN PATENT DOCUMENTS

| | | | |
|---|---|---|---|
| 0201254 | 11/1986 | European Pat. Off. | H04B 7/24 |
| 0639035 | 2/1995 | European Pat. Off. | H04Q 7/36 |
| 2690023 | 10/1993 | France | H04B 7/26 |

OTHER PUBLICATIONS

Internation Search Report—PCT/US97/07927 Nov. 1997.

*Primary Examiner*—Douglas W. Olms
*Assistant Examiner*—David R. Vincent
*Attorney, Agent, or Firm*—Fulbright & Jaworski L.L.P.

[57] ABSTRACT

A system for monitoring and adapting radio signals at a cell site to enable improved call management for mobiles active therein. Matrix switches, advantageously separate ones for the receive side and the transmit side of the cell site's radios, have extra ports to which other devices are connected. These devices include signal modifiers such as amplifiers, filters, attenuators or interference cancelers, through which the radio signals may be routed within the switches to enable modification of said signals on a per-channel basis. These devices further include signal generators which may inject signals such as tones or noise to ports in the switches to create pretextual radio conditions that may trigger desired call management results. An air interface controller, advantageously in combination with a cell neighborhood host controller, governs operation of the system. The controller includes a message player whose prerecorded messages may be patched through to a land line party to notify that the mobile party has entered a blackout zone.

42 Claims, 1 Drawing Sheet

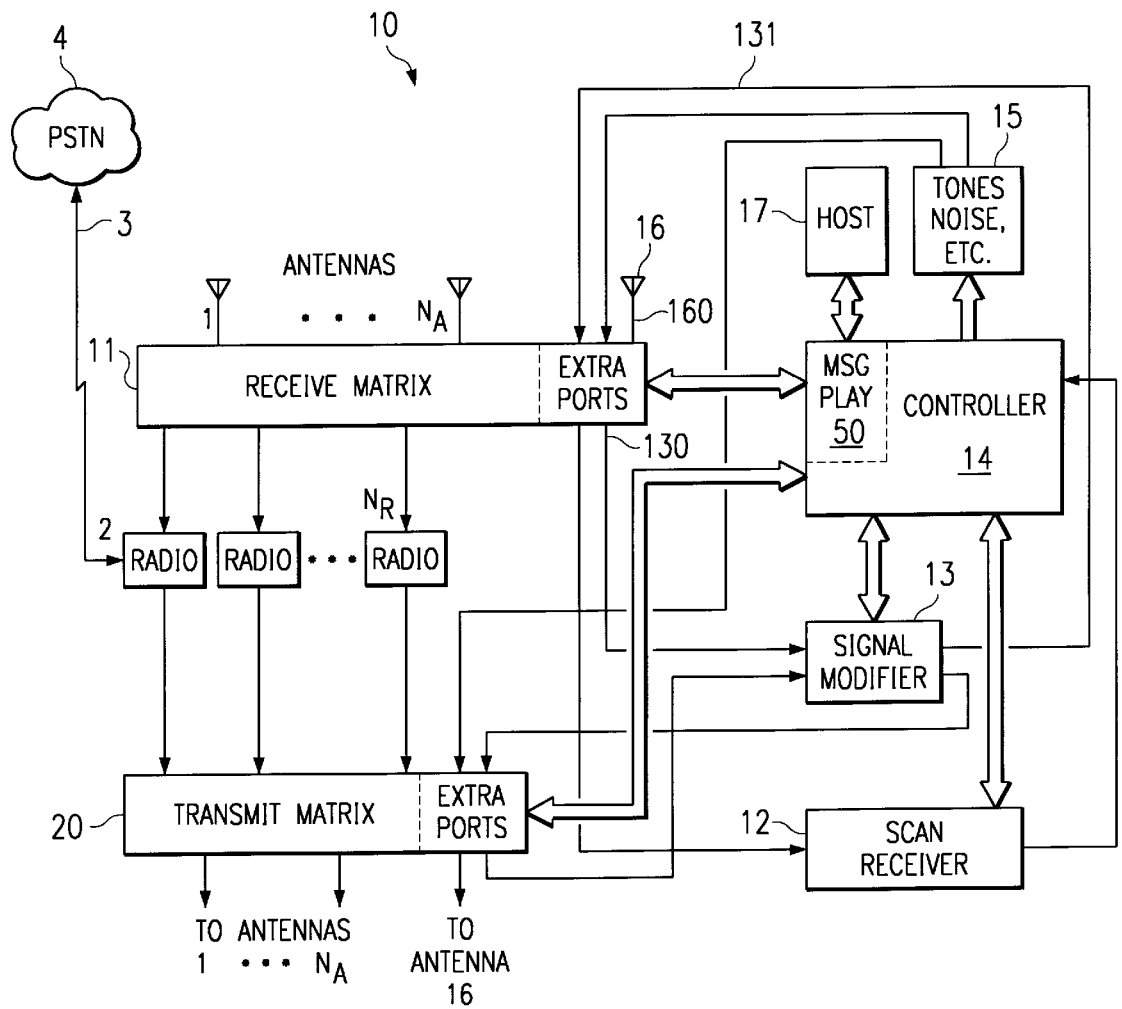

CELLULAR SYSTEM SIGNAL CONDITIONER

RELATED APPLICATIONS

The present application is a continuation of commonly assigned U.S. patent application Cellular System Signal Conditioner, Ser. No. 08/651,980 filed May 20, 1996, now U.S. Pat. No. 5,781,864 the disclosure of which is incorporated herein by reference.

Reference is hereby made to the following five commonly assigned U.S. patent applications: Narrow Beam Antenna Systems with Angular Diversity, Ser. No. 08/488,793 filed Jun. 8, 1995, now U.S. Pat. No. 5,563,610; Narrow Beam Antenna Systems with Angular Diversity, Ser. No. 08/520,316 filed Aug. 28, 1995, now U.S. Pat. No. 5,648,968; System and Method For Frequency Multiplexing Antenna Signals, Ser. No. 08/520,000 filed Aug. 28, 1995, now U.S. Pat. No. 5,859,854; and Method and Apparatus for Improved Control Over Cellular Systems, Ser. No. 08/582,525 filed Jan. 3, 1996, now U.S. Pat. No. 5,884,147; System and Method for Cellular Beam spectrum Management, Ser. No. 08/651,981 filed May 20, 1996, now U.S. Pat. No. 5,745,841, the disclosures of which five applications are incorporated herein by reference.

TECHNICAL FIELD OF THE INVENTION

This invention relates to cellular telecommunications systems and more particularly to an improved signal conditioner system that enables selective adjustment of individual mobile radio characteristics in order to enhance control thereof within a cellular network.

BACKGROUND OF THE INVENTION

A primary objective in designing and implementing intelligent systems that control and manage cellular communications is to be able to modify radio characteristics of calls in progress so as to maintain, and advantageously improve, the continuing quality of a cellular call. As disclosed in above-referenced, co-pending, commonly assigned U.S. patent application Method and Apparatus for Improved Control Over Cellular Systems, such improved control and management may be enabled by use of a host controller governing the interactive operation of cells in a neighborhood. With reference to this disclosure, it will be appreciated that many of the call management techniques described therein require making modifications, often pretextually, to radio signal conditions of calls in progress. It will be understood that in response to actual or anticipated interference conditions, these pretextual modifications may advantageously trigger various compensating actions such as reverse link power boost, antenna beam change, channel change, handoff, etc.

A problem experienced in the operation of such control and management systems is, however, that the desired modifications often need to be made on a per channel basis. It is well understood that an antenna beam generally transmits or receives a wide spectrum of energy in which multiple calls may be embedded. Modifications to radio characteristics of the beam as a whole will therefore tend to affect all calls whose activity is embedded in the particular antenna beam signal. Further, adaptations of the antenna beam as a whole, and particularly amplification thereof, will tend to alter that beam's interference effect upon other neighboring beams, thereby affecting transmission/reception conditions for radios not even connected to the adapted antenna.

An additional problem exists where it is necessary to have an area in a cell served by a remote antenna, perhaps in a blind spot directly underneath the cell site, or near a bridge or tunnel, or in a mall. In these situations case the coverage is very difficult to be obtained from conventionally placed co-located antennas, and often the remote antenna has to be physically located some distance away. Serving a cell with one or more such remote antennas can create a serious problem in cell site control, in that radio channels must be dedicated to serve that particular area. The control channel nonetheless has to appear as though it is serving a sector in the coverage area. This therefore creates a confusing situation for the cell site controller, which cannot tell whether the antenna it sees is a standard antenna located within the coverage area outdoors, or a remote antenna located within a building or another place where calls must be serviced differently.

Occasionally such remote antenna coverage is impractical or simply not provided in the cellular network. An example of this situation may be inside long tunnels. In such cases, blackout zones appear in the network. Even though the location of these blackout zones is known, and the passing there through by mobile signals can be identified and predicted, it is common for calls passing through blackout zones nonetheless to become disconnected. This is usually either because the pass-through time exceeds a predetermined silence time, typically about 5–10 seconds, after which the system automatically disconnects all calls, or because the land line party assumes a fault and hangs up.

There is, therefore, a need to be able to the modify radio characteristics, and pretextually when necessary, of a particular call signal being broadcast on an antenna on a particular channel, without affecting other call signals embedded in the same antenna signal, so as to enable improved control over call activity, advantageously on a neighborhood basis. There is also a need to be able, when required, to connect radio signals to remote antennas that are independent of and additional to the standard coverage areas, and to be able to manage calls connected thereto seamlessly with the rest of the cell site, including accounting for the particular needs of such non-standard coverage. Such needs may also include preventing an automatic disconnect when a mobile is in a known blackout zone, and alerting the land line party to stand by and not hang up while the mobile party is passing through such a blackout zone.

SUMMARY OF THE INVENTION

Among the primary features of the present invention are an oversized receive matrix switch and an oversized transmit matrix switch located at a cell site, each matrix switch with additional input and output ports than would normally be required to serve the cell site. The receive matrix switch and the control matrix switch are advantageously separate, and in normal operation work in combination with devices, control mechanisms and intelligence that address the above-described problems.

It will be understood that radios in operation in the cell site may be connected through the matrix switches to antennas covering the cell. This feature reflects cellular switching standard in the art. The extra ports, however, may be used to connect the radios to remote antennas or to connect a scanning device to various radios and antennas to monitor their status and then report same to the controller. The extra ports may further be used to route radio signals through signal modifying devices such as amplifiers, attenuators or filters. The extra ports may yet further be used to inject additional pretextual signals such as noise or tones to generate desired call management effects.

The collective operation of the present invention is controlled by an air interface controller (hereafter also referred to as the "controller"), advantageously also in control communication with a host controller that oversees call management in a neighborhood of cells. This controller/host combination provides intelligence to the operation of the matrix switches as described below in more detail. The controller also advantageously includes a message player, whose prerecorded messages may be overlaid on radio signals. The controller may play these messages through the receive matrix switch and then patch them through to a land line party that may be connected to a mobile passing through a known blackout zone such as a tunnel.

It will thus be appreciated that a technical advantage of the present invention is that the controller may connect a radio in operation on a particular channel to the antenna port for which the highest RSSI is detected, including a remote antenna on an extra port, regardless of the location of the antenna.

A further technical advantage of the present invention is that the scanning device may scan call activity through the switch and report back on the status thereof to the controller, advantageously without interrupting or affecting voice communications in the call in progress. The controller may then use this information to make decisions and take action that will enhance the continuing quality of collective calls.

A still further technical advantage of the present invention is that in making decisions and taking action, the controller may use the signal modifying devices and signal generating devices connected to the extra ports to modify pre-identified radio signals, or to inject an extra signal into one or more of the inputs or outputs of the switch. In this way, received and/or transmitted signals may be modified, pretextually when necessary, or signal/reference conditions may be artificially created so as to optimize call flow management. It will be further appreciated that the present invention thus enables the controller to manage signals on a per channel call-by-call basis.

A yet further advantage of the present invention is that intelligence in the controller and/or host may identify when a mobile is about to enter a blackout zone or encounter other significant interference. The controller may then send a message to the radio site controller to override any automatic disconnect, and may also play a prerecorded message alerting the land line party to stand by and not hang up.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which a high level block diagram illustrating the topology and architecture of the present invention is shown.

DESCRIPTION OF THE PREFERRED EMBODIMENTS

With reference to the accompanying drawing, which is a block diagram illustrating the present invention, system 10 is in a cell governed by air interface controller 14 (hereafter also referred to as "controller"). Antennas 1 through nA are situated throughout the cell in a traditional co-location deployment, and are connected to receive matrix 11, a switch, whose operation is controlled by controller 14. It will be understood, particularly with reference to the above cited, co-pending, commonly assigned U.S. patent applications Apparatus, Systems and Methods For Antenna Combining in Wireless Communications Systems and Multiple Antenna Transmission System, that antennas 1 through nA may be single beam antennas, traditional three-face antennas, or narrow beam antennas similar to those disclosed in the cited co-pending applications.

Receive matrix 11 serves as a switch to connect various of antennas 1 through nA to the receive sides of radios 2 through nR according to the instructions of controller 14. Radios 2 through nR are connected via one or more land lines 3 to the Public Switched Telephone Network (PSTN) 4. In this way, it will be understood that signals incoming from mobiles served by system 10 will be received on ones of antennas 1 through nA, switched through receive matrix 11 to ones of radios 2 through nR, and then routed along land lines 3 to their destinations on PSTN 4.

Receive matrix 11 also has extra ports. One or more additional antennas 16 are connected to one of these extra ports and may typically be interior to a building or at some other non-standard location such as described above. Additional antenna 16 is connected to an extra port of receive matrix 11 by line 160, which may advantageously be a coaxial cable, or a fiber optic line, or even a microwave link. Additional antenna 16 may advantageously be omni-directional antenna comprising a leaky coaxial cable, or it may be a repeater.

Receive matrix 11 also has scan receiver 12 connected to one of the extra ports. The operation of scan receiver 12, scanning signal conditions between radios and antennas connected within receive matrix 11, is controlled by controller 14. Typically, controller 14 may use a simple algorithm to tell scan receiver 12 to tune to a specific channel and scan for signal conditions on that channel for each antenna connected to receive matrix 11, whether a radio is connected to that antenna or not. Scan receiver 12 then reports data back to controller 14 before moving on to the next channel scan.

Let it be assumed that the current status of system 10 is that mobiles have activated radios 2 through nR and calls are currently in progress using those radios. Controller 14 is assigning radios 2 through nR beams on various of antennas 1 through nA, or possibly additional antenna 16, according to information received by scan receiver 12. A radio site controller, not shown, assigns and manages channels on which radios 2 through nR are operating.

Then, as the mobiles actually move, it is often necessary that radios 2 through nR periodically be assigned to different antennas according to reception conditions. Controller 14 continuously instructs scan receiver 12 to look through all of the available antenna ports and report reception information. Controller 14 then instructs receive matrix 11 to connect the radio to one or more ports, and advantageously two ports, whose antennas are likely to give the best conditions. It will be appreciated by those in the art that typically diversity is used in the radio receiver and so the two "best" antennas will be connected thereto.

It will be appreciated that a situation may occur where controller 14 may foresee a potential interference situation for a given radio. For example, controller 14 may be equipped with features such as disclosed in above-referenced co-pending commonly assigned U.S. patent application Method and Apparatus for Improved Control Over Cellular Systems, in which such potential interference situations may be foreseen by comparing cell neighborhood data, advantageously in combination with historical and/or topographical information regarding the cell network itself.

According to the present invention, therefore, having identified a potential interference situation, controller 14 has options on taking compensating action. A first option employs signal modifier 13, which may include one or more of a number of devices, such as a filter, an amplifier, or an attenuator, or combinations thereof Signal modifier 13 is also connected to the extra port capability of receive matrix 11 through input line 130 and output line 131, and is controlled by controller 14. Controller 14 routes the received signal through to signal modifier 13 for the radio for which interference is anticipated. According to disposition instructions from controller 14, signal modifier 13 then modifies the received signal so as to compensate for the anticipated interference condition. In this regard, signal modifier 13 might also include an interference canceler device that may be routed as required to signals experiencing interference.

A second option afforded by the present invention to controller 14 to compensate for an anticipated interference condition is by employing generator IS. Feeding into an extra port in receive matrix 11 through line 141, the operation of generator 15 is again controlled by controller 14. It will be understood, however, that there is no feed into generator 15 from receive matrix 11.

According to instructions from controller 14, generator 15 may generate one or more alternative outputs such as noise or tones, or combinations thereof, to affect the assignment of radios to antennas. Say, for example, it is anticipated that the behavior of a mobile in a nearby cell will cause a particular radio to encounter an interference problem on making its next logical antenna or channel assignment change. Controller 14 may instruct generator 15 to generate artificial baseband noise below voice level and then route that noise to the port in receive matrix 11 to which that radio would logically be connected next. That noise signal would cause the radio site controller to believe that there is an imminent actual interference event and not connect to that antenna on that channel, thus avoiding the anticipated interference problem. Instead, the radio site controller most likely would try to change channels or hand off to another cell. It will be understood that actions by generator 15 in this regard advantageously take place without interrupting or affecting voice communications in the signal acted upon.

Again with reference to co-pending commonly assigned U.S. patent application Method and Apparatus for Improved Control Over Cellular Systems, it will be understood that the present invention may also facilitate improved neighborhood cellular communication through intercommunication with host 17. In accordance with the disclosure of said co-pending application, host 17 may be coordinating cellular call activity in several cells, advantageously on a neighborhood basis.

In such a deployment, it will be thus appreciated that controller 14 may also take action in accordance with the present invention according to instructions from host 17, based on call activity in nearby cells. For example, scan receiver 12 may be scanning antenna conditions on ports within receive matrix 11 on a channel that, according to predefined re-use patterns, is not normally used in its own cell site. Suppose scan receiver 12 detects the presence of a mobile radio using that channel that is about to enter the cell site or about to depart another cell site. That information is relayed back to controller 14. Although controller 14 itself has no interest in this data, it will pass it on to host 17 to enable higher level control over a cell neighborhood. Host 17 may then, for example, use the information to direct the operation of other interested controllers in neighboring cell sites to which host 17 is also connected. Alternatively, host 17 may combine this information with other data received from other controllers and then send back instructions to controller 14 to take action in accordance with an overall neighborhood condition.

It will be further appreciated that in scanning for reception conditions, scan receiver 12 may not only monitor for received signal strength, but also for a supervisory audio tone, or "SAT" tone. In AMPS radio there are three SAT tones and in NAMPS radio there are seven. Each wireless communication typically carries one of the SAT tones, and cellular control systems may use the SAT tone accompanying a particular communication to further uniquely identify the communication to a particular radio.

In this way, information regarding the SAT tones detected by scan receiver 12 may be fed back to controller 14 to further substantially reduce the chance that controller 14, and ultimately host 17, will not misidentify the calls in progress and connect a mobile to the wrong radio.

In one embodiment herein, scan receiver 12 may be an extremely narrow band scan receiver such as one which uses a DSP filter. In such an application of the present invention, scan receiver 12 could advantageously differentiate among received channels less than 100 Hz wide. Such resolution would enable detection by scan receiver 12 of a potential co-channel interferer with the same SAT, which might be utilizing the same channel but on a slightly different carrier frequency.

It will be thus understood that once scan detector 12 has made this detection and has then fed this information to controller 14, host 17, through controller 14, may be made immediately aware of C/I, the carrier to interference ratio for the call.

Again with further reference to co-pending commonly assigned U.S. patent application Method and Apparatus for Improved Control Over Cellular Systems, it will be understood that C/I measurements regarding calls in progress may be advantageously analyzed in combination by host 17 and/or controller 14 to facilitate improved control over call activity in a neighborhood. As disclosed in Method and System for Improved Control Over Cellular Systems, when there are no calls in progress detected by scan receiver 12 on a particular channel at a particular time, interference measurements from one or more ports may be combined by host 17 and/or controller 14 to compile an interference map of the neighborhood for use by neighboring cell sites in controlling call activity. As each subsequent radio is keyed onto the air, the new signal, as it appears to scan receiver 12 on all ports within receive matrix 11, then gives host 17 and/or controller 14 an instant measurement of C/I for that call.

The foregoing has so far discussed control over antenna assignment with regard to reception of signals by radios 2 through nR. On transmission, analogous but not identical logic applies.

Transmit matrix 20 is a switch also controlled by controller 14 and has ports to which transmit signals from each of radios 2 through nR may be connected. Analogous to receive matrix 11, transmit matrix 20 has extra ports, one of which may also be connected to additional antenna 16, and others of which may be connected to signal modifier 13 and generator 15. Also analogous to receive matrix 11, controller 14 instructs transmit matrix 20 to connect the transmit signals of ones of radios 2 through nR to antennas according to intelligence in controller 14 and/or host 17.

In a normal situation, reciprocity might imply that the transmit port on transmit matrix 20 and the receive port on receive matrix 11 be connected to the same antenna. However, since interference is not always reciprocal, and may often exhibit local variations, and there may very well be a better choice of transmit output than received input. This determination is advantageously made at host 17 which, as described above, may interpret data from several neighboring cell sites. For example, host 17 might detect a potential interference condition in another cell site if a particular radio was to transmit in this cell site on a particular antenna. Host 17 then informs controller 14 of the potential interference problem and that controller 14 should avoid connecting the transmit signal of that radio to that antenna if possible. Controller 14 may then determine whether local transmission would be sufficiently strong on another available antenna, and if so, directs transmit matrix 20 to make connections accordingly.

Alternatively, if no suitable standard pattern antennas are available, then controller 14 may instruct transmit matrix to connect the radio in question to a remote antenna such as additional antenna 16.

For coverage of blackout zones, controller 14 also includes message player 50. Message player 50 is disposed to play prerecorded messages which controller 14 may overlay on radio signals at receive matrix 11. Controller 14 is also disposed, advantageously upon receipt of a special signal from generator 15 to override any automatic disconnect implemented by the radio site controller after a predetermined time (typically 10 seconds) of radio silence.

In this way, intelligence in host 17 and/or controller 14 will identify a mobile under system 10's control that is about to enter a blackout zone. This identification is advantageously enabled by cross-referencing triangulation data disclosing the location of the mobile with known topographical data regarding the network, such as is taught in above-referenced, co-pending, commonly assigned U.S. application Method and Apparatus For Improved Control Over Cellular Systems. The mobile having gone into blackout, message player 50 in controller 14 plays a prerecorded message advising the land line party that the mobile party is temporarily out of radio reception but will shortly return, and that the land line party should stand by and not hang up. Controller 14 patches this message through to the land line party by overlaying the message at the in receive matrix 11 to which the land line party's radio is connected.

Further, while the message is being played and advantageously periodically repeated, controller 14 also alerts the radio site controller not to execute an automatic disconnect pending the return to cellular coverage of the mobile party. Alternatively, where holding the call is not feasible, the land line may be held and a quick reconnect advantageously established once the radio emerges from the blackout.

Notwithstanding the foregoing disclosure to a separate receive matrix switch 11 and transmit matrix switch 20, it will be understood by those in this art that the matrix switching of the present invention need not be limited to this configuration, and that equivalent matrix switching, standard in the art, may also enable an embodiment including a single, larger switch, or a matrix switch array of several interconnecting switches.

It will be further understood by those in this art that the logic and intelligence of the present invention may also be embodied on software, executable on a general purpose computer having a processor, a memory, a data storage capacity, and advantageously a display device.

Although the present invention and its advantages have been described in detail, it should be understood that various changes, substitutions and alterations can be made herein without departing from the spirit and scope of the invention as defined by the appended claims.

I claim:

1. A radio signal manipulation system, comprising:
   a switch matrix;
   a plurality of antenna beams in information communication with the switch matrix;
   a radio which is connected to the PSTN in information communication with the switch matrix;
   a controller in information communication with the switch matrix, the controller instructing the switch matrix to connect ones of the antenna beams to the radio; and
   a signal conditioner in information communication with the switch matrix, the signal conditioner modifying a radio signal associated with at least one of the antenna beams, wherein the switch matrix is disposed between the at least one antenna beam and the signal conditioner and the switch matrix is also disposed between the radio and the signal conditioner.

2. The system of claim 1, wherein the signal conditioner is also in information communication with the controller, and wherein modification of the at least one radio signal by the signal conditioner is according to modifying instructions from the controller.

3. The system of claim 2, further comprising:
   a scan receiver in information communication with the switch matrix and the controller, the scan receiver monitoring prevailing conditions of radio signals associated with ones of the antenna beams and provides prevailing condition information to the controller, wherein the controller instructing the signal conditioner is according to said prevailing condition information.

4. The system of claim 2, wherein the controller is in information communication with a separate host, and wherein the controller instructing the signal conditioner is according to information provided by the separate host.

5. The system of claim 1, in which the signal conditioner includes a signal conditioning device selected from the group consisting of an amplifier, a filter, an attenuator and an interference canceler.

6. The system of claim 1, wherein information communication between the plurality of antenna beams and the switch matrix is provided through a first set of like interfaces including interfaces in addition to those required for information communication with the plurality of antenna beams, and wherein information communication between the radio and the switch matrix is provided through a second set of like interfaces including interfaces in addition to those required for information communication with the radio, wherein the information communication between the switch matrix and the signal conditioner is provided through at least one interface of the first set of interfaces and at least one interface of the second set of interfaces.

7. The system of claim 1, wherein the switch matrix comprises:
- a transmit switch matrix providing information communication of forward link radio signals from the radio to ones of the antenna beams; and
- a receive switch matrix providing information communication of reverse link radio signals from ones of the antenna beams to the radio.

8. The system of claim 7, wherein the signal conditioner is in information communication with both the transmit switch matrix and the receive switch matrix to thereby provide modified radio signals in both the forward link and the reverse link.

9. The system of claim 1, further comprising:
- a signal generator in information communication with the switch matrix, the signal generator injecting a predetermined generated signal into the switch matrix to be selectively communicated to ones of the antenna beams or the radio under control of the controller.

10. The system of claim 9, wherein the signal generator is also in information communication with the controller, and wherein generation of the injected signal by the signal generator is according to generating instructions from the controller.

11. The system of claim 9, wherein the signal generator generates signals of a type selected from the group consisting of tones, prerecorded audio messages, and noise.

12. The system of claim 11, wherein said messages are played to remote parties in information communication with the radio when a Received Signal Strength Index (RSSI) falls below a predetermined level.

13. The system of claim 11, wherein said messages are played to remote parties in information communication with the radio when a mobile unit in information communication with the radio is located in pre-identified territorial positions.

14. The system of claim 1, wherein the radio is in information communication with a remote party through a land line, and further comprising:
- disconnect means adapted to automatically disconnect the remote party from the radio where, for a predetermined period of time, a monitored radio signal parameter falls below a predetermined level; and
- the controller is adapted to override the disconnect means when a mobile unit in information communication with the radio is located in a pre-identified territorial position.

15. The system of claim 1, wherein the radio is in information communication with a remote party through a land line, and further comprising:
- disconnect means adapted to automatically disconnect the remote party from the radio where, for a predetermined period of time, a monitored radio signal parameter falls below a predetermined level, wherein the controller is adapted to hold the land line following operation of said disconnect means; and
- reconnect means, responsive to the controller, adapted to reestablish information communication between the radio and a remote party previously disconnected.

16. A radio signal manipulation system, comprising:
- a switch matrix;
- a plurality of antenna beams in information communication with the switch matrix;
- a radio which is connected to the PSTN in information communication with the switch matrix;
- a controller in information communication with the switch matrix, the controller instructing the switch matrix to connect ones of the antenna beams to the radio; and
- a signal generator in information communication with the switch matrix, the signal generator injecting a predetermined generated signal into the switch matrix to be selectively communicated to ones of the antenna beams or the radio under control of the controller.

17. The system of claim 16, wherein the signal generator is also in information communication with the controller, and wherein generation of the injected signal by the signal generator is according to generating instructions from the controller.

18. The system of claim 17, further comprising:
- a scan receiver in information communication with the switch matrix and the controller, the scan receiver monitoring prevailing conditions of radio signals associated with ones of the antenna beams and provides prevailing condition information to the controller, wherein the controller instructing the signal generator is according to said prevailing condition information.

19. The system of claim 17, wherein the controller is in information communication with a separate host, and wherein the controller instructing the signal generator is according to information provided by the separate host.

20. The system of claim 16, wherein the signal generator generates signals of a type selected from the group consisting of tones, prerecorded audio messages, and noise.

21. The system of claim 20, wherein said messages are played to remote parties in information communication with the radio when a Received Signal Strength Index (RSSI) falls below a predetermined level.

22. The system of claim 20, wherein said messages are played to remote parties in information communication with the radio when a mobile unit in information communication with the radio is located in pre-identified territorial positions.

23. The system of claim 16, wherein information communication between the plurality of antenna beams and the switch matrix is provided through a set of like interfaces including interfaces in addition to those required for information communication with the plurality of antenna beams, and wherein the information communication between the switch matrix and the signal generator is provided through at least one interface of the set of interfaces.

24. The system of claim 16, wherein the switch matrix comprises:
- a transmit switch matrix providing information communication of forward link radio signals from the radio to ones of the antenna beams; and
- a receive switch matrix providing information communication of reverse link radio signals from ones of the antenna beams to the radio, wherein the signal generator is in information communication with both the transmit switch matrix and the receive switch matrix to thereby provide generated signals in both the forward link and the reverse link.

25. The system of claim 16, wherein the radio is in information communication with a remote party through a land line, and further comprising:
- disconnect means adapted to automatically disconnect the remote party from the radio where, for a predetermined period of time, a monitored radio signal parameter falls below a predetermined level; and
- the controller is adapted to override the disconnect means when a mobile unit in information communication with the radio is located in a pre-identified territorial position, and the controller is adapted to instruct the signal generation means to generate a predetermined signal for receipt by the remote party through the land line.

26. The system of claim 16, further comprising:
a signal conditioner in information communication with the switch matrix, the signal conditioner modifying a radio signal associated with at least one of the antenna beams, wherein the switch matrix is disposed between the at least one antenna beam and the signal conditioner and the switch matrix is also disposed between the radio and the signal conditioner.

27. The system of claim 26, wherein the signal conditioner is also in information communication with the controller, and wherein modification of the at least one radio signal by the signal conditioner is according to modifying instructions from the controller.

28. A method of manipulating radio signals, comprising the steps of:
coupling ones of a plurality of antenna beams to a radio which is connected to the PSTN through an array providing selectable signal paths between the plurality of antenna beams and the radio;
communicating radio signals associated with the radio through the plurality of antenna beams, each of said radio signals having one or more communication characteristics associated therewith;
processing system communication information including local communication information obtained by monitoring ones of the communication characteristics of said radio signals;
controlling the array to select particular signal paths to provide coupling of the antenna beams to the radio by the coupling step, wherein said controlling step is based on said processed system transmission information;
conditioning a radio signal in the signal path coupling the radio to at least one of the plurality of antenna beams, wherein said controlling step operates to control the conditioning step through selection of signal paths;
coupling each antenna beam of the plurality of antenna beams to a separate port on the array; and
coupling a signal conditioner to a further separate port on the array, wherein the controlling step operates to establish a signal path between the at least one antenna beam and the signal conditioner and between the signal conditioner and the radio.

29. The method of claim 28, wherein said system communication information further includes non-local communication information including communication characteristics of radio signals communicated through other antenna beams not included in said plurality thereof.

30. The method of claim 28, wherein said conditioning step includes one or more substeps selected from the group consisting of:
(a) injecting noise into radio signal;
(b) injecting one or more tones into said radio signal;
(c) amplifying said radio signal;
(d) filtering said radio signal;
(e) attenuating said radio signal; and
(f) canceling interference on said radio signal.

31. The method of claim 28, wherein said radio is in communication with a land line party, and further comprising the step of:
playing a message to the land line party in response to one or more predetermined events.

32. The method of claim 31, wherein the message is played when a Received Signal Strength Index (RSSI) falls below a preselected power level.

33. The method of claim 31, wherein the message is played when a subscriber unit wirelessly communicating with said radio is located within a pre-identified territorial position.

34. The method of claim 28, wherein said radio is in communication with a land line party, and further comprising the steps of:
overriding a disconnecting sequence, which disconnects the land line party from communication with a subscriber unit communicating with the radio when a Received Signal Strength Index (RSSI) falls below a preselected power level, when the subscriber unit is located at a pre-identified territorial position.

35. A system for providing communication of desired radio signals between a base transceiver station radio arrangement and subscriber units operating within an area defined by a plurality of antenna beams, said system comprising:
a plurality of antenna beams associated with a base transceiver antenna system;
a radio arrangement which is connected to the PSTN having a plurality of inputs and a plurality of outputs, wherein ones of the radio inputs and corresponding ones of the radio outputs may be utilized in communicating with a particular subscriber unit;
a receive matrix coupled to each of said antenna beams through a first set of receive ports and coupled to each of said radio inputs through a second set of receive ports, wherein said first set of receive ports includes ports in addition to those coupled to said plurality of antenna beams, and wherein said second set of receive ports includes ports in addition to those coupled to said radio inputs;
a transmit matrix coupled to each of said antenna beams through a first set of transmit ports and coupled to each of said radio outputs through a second set of transmit ports, wherein said first set of transmit ports includes ports in addition to those coupled to said plurality of antenna beams, and wherein said second set of transmit ports includes ports in addition to those coupled to said radio outputs;
a signal modifier coupled to at least one of said first set of receive ports or said first set of transmit ports and to a corresponding at least one of said second set of receive ports or said second set of transmit ports; and
a controller coupled to said receive matrix and said transmit matrix to provide selectable communication of radio signals between the transmit and receive ports of the radio arrangement and the antenna beams, wherein the selectable communication includes disposing the signal modifier in a signal path between the radio arrangement and the antenna beams.

36. The system of claim 35, wherein the signal modifier is coupled to at least one of said first set of receive ports and to at least one of said first set of transmit ports, and wherein the signal modifier is coupled to at least one of said second set of receive ports and to at least one of said second set of transmit ports.

37. The system of claim 36, wherein the signal modifier is coupled to the controller to provide information thereto with respect to a modified radio signal.

38. The system of claim 35, wherein the signal conditioner is selected from the group consisting of:
- an amplifier;
- a filter;
- an attenuator; and
- an interference canceler.

39. The system of claim 35, further comprising:
- a signal generator coupled to at least one of said first set of receive ports or said first set of transmit ports.

40. The system of claim 39, wherein the signal generator is coupled to at least one of said first set of receive ports and to at least one of said first set of transmit ports.

41. The system of claim 39, wherein the signal generator generates signals selected from the group consisting of:
- a tone; and
- noise.

42. The system of claim 39, wherein the signal generator generates a voice message.

* * * * *